United States Patent
Grando et al.

(10) Patent No.: US 6,289,792 B1
(45) Date of Patent: Sep. 18, 2001

(54) GAS BARBECUE WITH FLAME TIMER FOR GRILLING FOOD

(75) Inventors: Maurizio Grando, Chirignago; Michele Bortoliero, Monselice, both of (IT); Ken Fox, Charlotte, NC (US)

(73) Assignee: OP Controls SpA, Pernumia (IT)

( * ) Notice: Subject to any disclaimer, the term of this patent is extended or adjusted under 35 U.S.C. 154(b) by 0 days.

(21) Appl. No.: 09/653,545

(22) Filed: Aug. 31, 2000

(30) Foreign Application Priority Data

Aug. 31, 1999 (IT) ................................ V199A0181

(51) Int. Cl.[7] .................. A23L 1/00; A47J 37/00; F24C 3/00
(52) U.S. Cl. ................ 99/332; 99/337; 99/400; 99/446; 126/25 R; 126/39 E; 126/41 R
(58) Field of Search ............. 99/325–336, 337, 99/338, 341, 344, 339, 400, 340, 401, 390, 444–446, 447, 450, 448, 481, 482; 126/25 R, 9 R, 25 B, 39 E, 41 R, 38 BA; 137/624.11, 624.12, 624.21; 251/11, 74, 129.1

(56) References Cited

U.S. PATENT DOCUMENTS

| | | | |
|---|---|---|---|
| 3,964,463 | * 6/1976 | Dailey | 126/25 R |
| 4,441,480 | * 4/1984 | Rickman et al. | 126/41 R |
| 4,686,958 | * 8/1987 | Skelton et al. | 99/339 |
| 4,732,137 | * 3/1988 | Parsons | 126/25 R |
| 4,781,170 | * 11/1988 | Perl | 99/390 X |
| 4,823,838 | * 4/1989 | Ferlin | 137/624.12 |
| 4,930,488 | * 6/1990 | Pearman et al. | 126/39 E |
| 5,213,075 | * 5/1993 | Stephen et al. | 126/25 B |
| 5,333,596 | * 8/1994 | Clifford | 126/41 R |
| 5,445,066 | * 8/1995 | Rosset | 99/446 |
| 5,458,294 | * 10/1995 | Zachary et al. | 431/80 X |
| 5,544,685 | * 8/1996 | Stieferman | 137/429 X |
| 5,546,851 | * 8/1996 | Goto | 99/446 |

* cited by examiner

Primary Examiner—Timothy F. Simone
(74) Attorney, Agent, or Firm—Dykema Gossett PLLC

(57) ABSTRACT

The invention comprises a gas barbecue (1; 20) for grilling food comprising a box-shaped container (2) with a griddle (3) that carries the food being cooked; one or more burners (4) placed underneath said griddle (3), each of which has a gas supply line (5); an ignition device (14) for said one or more burners (4); a main pipeline (6) which is connected to said supply lines (5) for each burner (4), connected to a gas supply source (F) and provided with a cut-off valve (7; 21); the cut-off valve's operation is connected to a timer (8) suited to keeping it open for a pre-set time.

8 Claims, 3 Drawing Sheets

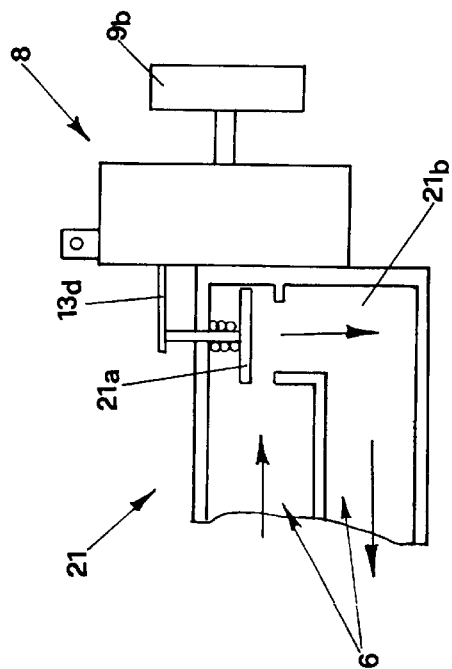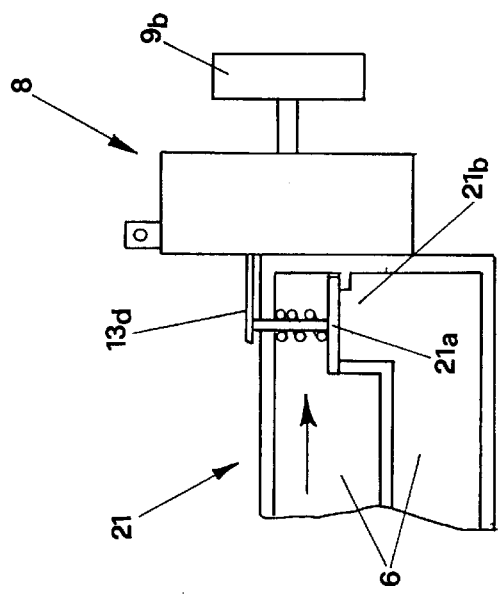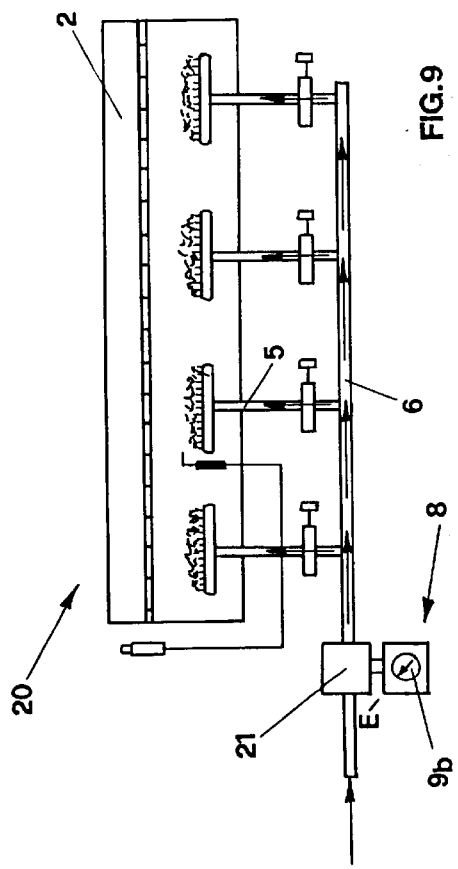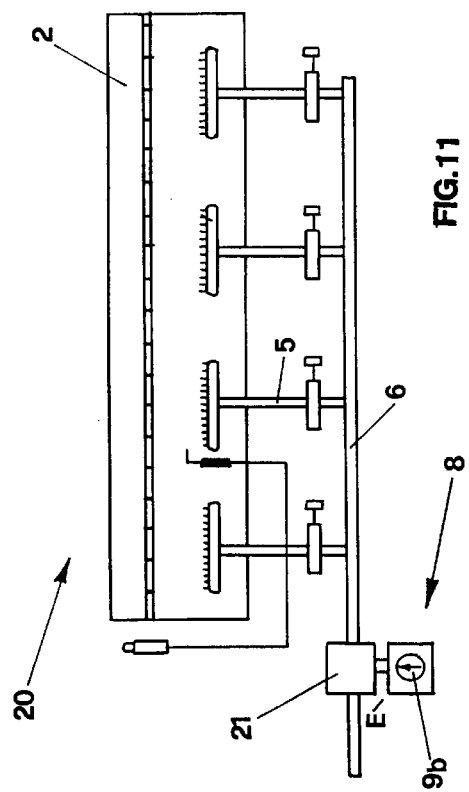

GAS BARBECUE WITH FLAME TIMER FOR GRILLING FOOD

The invention concerns a gas barbecue for grilling food provided with flame timer device.

As is known to grill food special cookers are used, that are commonly called barbecues, in various shapes and sizes and supplied by gas, electric current or charcoal.

With special regard to gas cookers or barbecues, these basically comprise an open topped, box-shaped container, fitted inside with a griddle that carries the food being cooked. Underneath the griddle there are one or more burners that are supplied by the household mains gas or by bottled liquid gas. When the barbecue is used for grilling meats, the fat that drips off the meat while cooking deposits on the griddle and on the bottom of the container and has to be removed when finished cooking.

To avoid having to carry out this unpleasant operation, when finished cooking the user often leaves the barbecue burning at its maximum flame for enough time to allow the heat produced without food to cook to carbonize the fat deposits, thereby making their removal in a charred form much easier. This practice is undoubtedly effective from a practical viewpoint, although it does have the inconvenience of damaging the barbecue, at times even irreparably, if an empty flame burns continuously for too long a time or if the user forgets it left burning.

In fact it is understandable that operating the barbecue while empty and at its maximum flame, especially if lasting for long periods, can lead to overheating and deformation of the actual barbecue.

This invention intends to overcome the aforementioned inconvenience. In particular a first scope of the invention is to produce a gas barbecue provided with a flame shutoff device after a pre-set period of time. Another scope is that the shutoff device allows to adjust the flame time at the user's discretion.

Said scopes are achieved by producing a gas barbecue for grilling foods that, in accordance with the main claim, comprises:

- a box-shaped container fitted inside with a griddle that carries the food being cooked;
- one or more burners placed underneath said griddle, each of which has a gas supply line.
- a main pipeline which is connected to said supply lines for each burner, connected to a gas supply source and provided with a cut-off valve;
- at least one ignition device for said one or more burners, and wherein the operation of said cut-off valve is connected to a timer suited to keeping it open for a pre-set time.

According to a preferred form of execution the timer that is implemented is of the type comprising a clockwork timer unit, which is mechanically linked to a mobile assembly that works on a pair of electric contacts to set them open or closed.

According to a preferred form of execution, the timer is electrically wired to the main cut-off valve and has its electric contacts wired in series to an electrical thermocouple circuit controlling the gas cut-off valve.

According to another form of execution the timer is mechanically linked to the cut-off valve with the open/close mobile assembly having contacts, mechanically linked to the plug of the cut-off valve.

An advantage of the barbecue invention is that it provides a higher degree of safety than equivalent barbecues since it has eliminated the chance of it being damaged by accidentally leaving an empty flame burning for long periods.

Said scopes and advantages shall be better explained during the description of preferred forms of execution of the invention that are given as a guideline but not a limitation and refer to the attached figures where:

FIG. 9 illustrates a diagram in longitudinal section of a variant in execution of the barbecue invention in one operating position;

FIG. 10 illustrates an enlarged detail of the longitudinal section of the gas cut-off valve of the barbecue in FIG. 9;

FIG. 11 illustrates the barbecue in FIG. 9 in a different stage of operation;

FIG. 12 illustrates an enlarged longitudinal section of the cut-off valve of the barbecue in FIG. 11.

Figure 1:
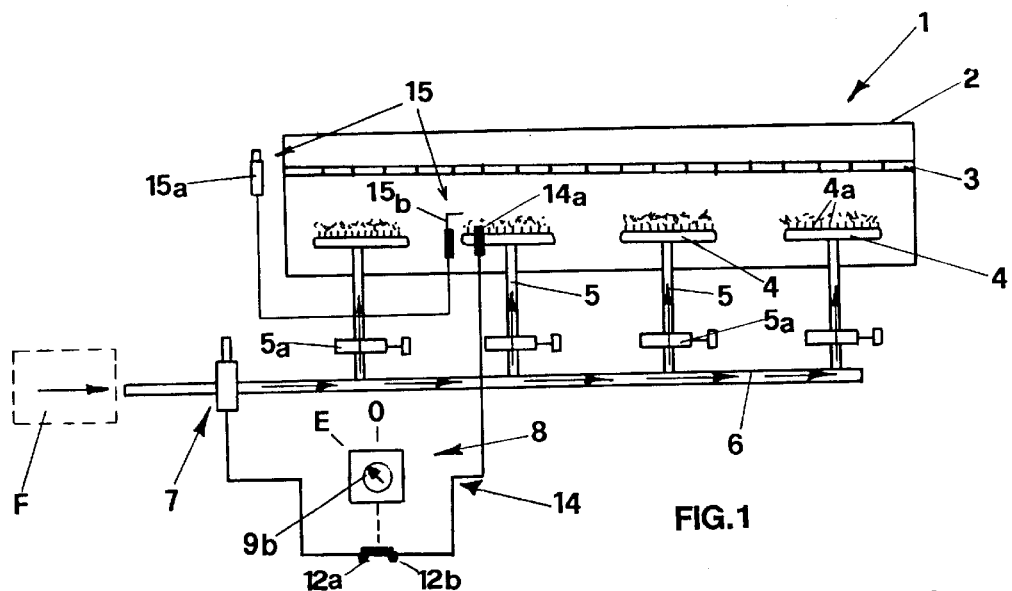
FIGS. 1 to 3 illustrate diagrams in longitudinal section of the gas barbecue invention in three different stages of its operation
Figure 2:
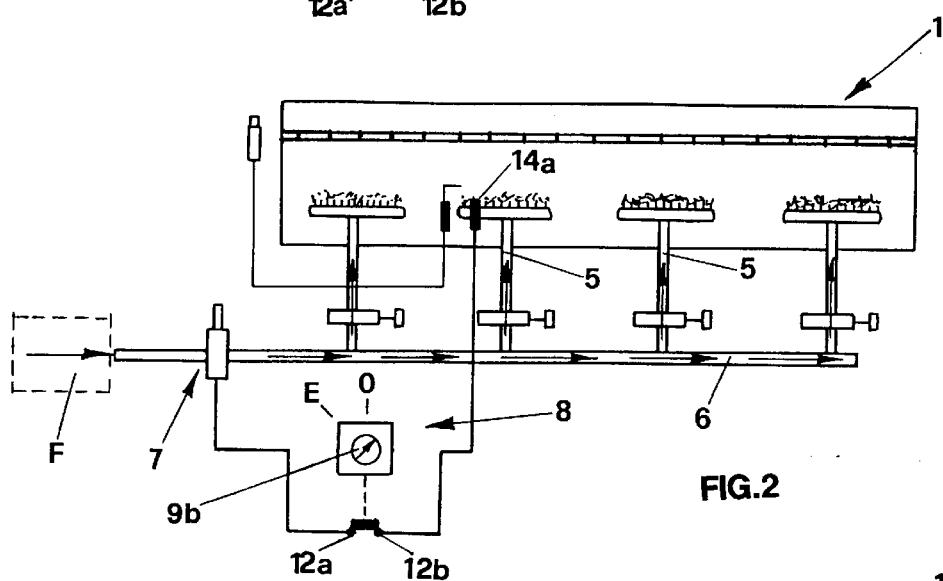
Figure 3:
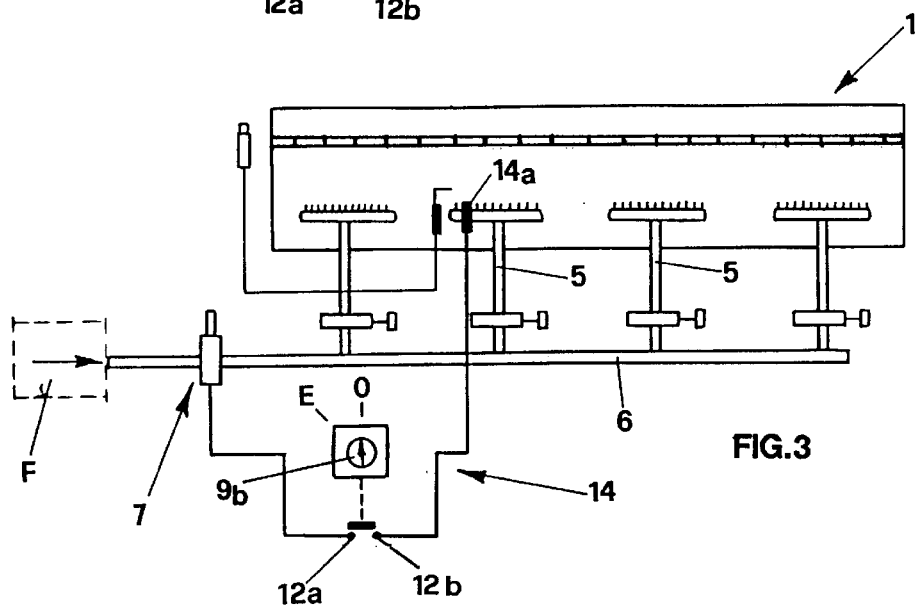

The barbecue invention is shown in FIGS. 1 to 3, where it is generally indicated by 1 and where it can be seen that it comprises a basically opentopped, box-shaped container 2 and fitted inside with a griddle 3 that carries the food being cooked.

Underneath the griddle 3 there are burners 4 each fitted with nozzles 4a serving as gas outlets.

The quantity of burners can obviously vary depending on the size of the barbecue.

Each burner 4 receives gas from a supply line 5 provided with regulator cock 5a connected to a main pipeline 6 fitted with a cut-off valve 7 and connected to a gas supply source, indicated by F in the diagram, which may consist of the household mains supply or a bottle.

According to the invention the operation of the cut-off valve 7 is connected to a timer 8 suited to keeping it open for a pre-set time.

To be more precise FIGS. 4 to 8 show how the timer 8 is of the type comprising a box casing 8a which houses:

- a clockwork timer unit, generally indicated by 9, consisting of a commonly known system of wheelworks 9a and spring-loading, operated by an external knob 9b;
- an actuator cam 10 mechanically linked to the clockwork timer unit 9;
- a pair of normally open electric contacts, generally indicated by 11, and consisting of a fixed contact 11a connected to a first terminal 12a and by a mobile contact 11b, held by a flexible reed 11c connected to a second terminal 12b;
- a mobile assembly, generally indicated by 13, which comprises: a prod 13a that works against the flexible reed 11c to open/close the contacts 11a, 11b and hinged by an arm 13b onto the box casing 8a; a pushrod 13c that works against the actuator cam 10; a protruding pin 13d that is used to ring the signal bell (not illustrated in the diagrams).

According to the execution in description, the pushrod 13c and the protruding pin 13d are a solid part of the arm 13b, since they are made by suitably modelling the arm 13b itself.

Figure 4:
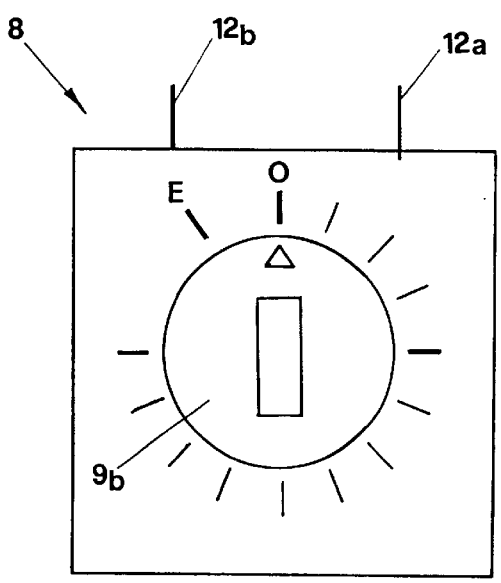
FIG. 4 illustrates a front view of the timer implemented by the barbecue invention
Figure 5:
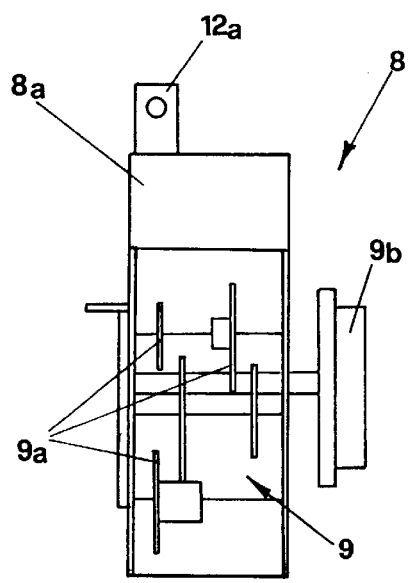
FIG. 5 illustrates a side view of the timer in FIG. 4.
Figure 6:
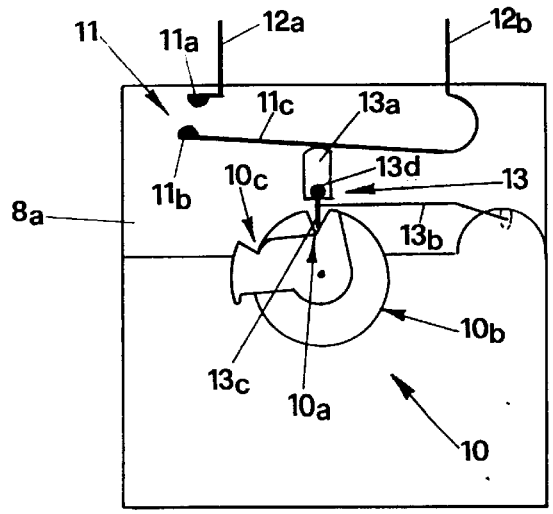
FIGS. 6 to 8 illustrate a rear view of the timer in FIG. 4 in three different operating positions.

In particular, as can be seen in FIG. 6, when the knob 9b is set on the notch marked by O in FIG. 4, the pushrod 13c of the mobile assembly 13 fits into the first recess 10a of the cam 10 so that the electrical contacts 11a, 11b are opened.

Figure 7:
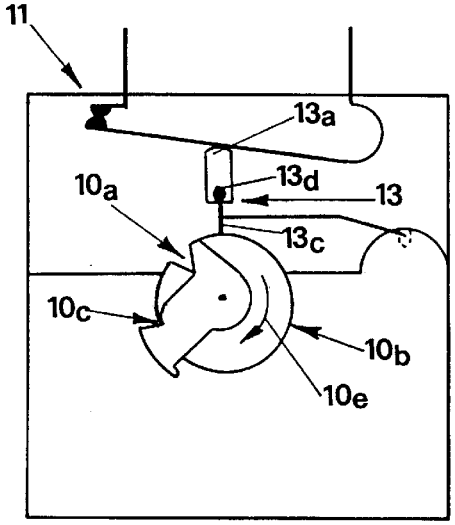

If, vice versa the knob 9b is set to any of the timer's graduations, each corresponding to a flame time adjustment, the pushrod 13c brushes against the outer edge 10b of the cam 10 as can be seen in FIG. 7, and the prod 13a pushes the flexible reed 11c setting the timer in its operating position with the contacts 11a, 11b closed.

Figure 8:
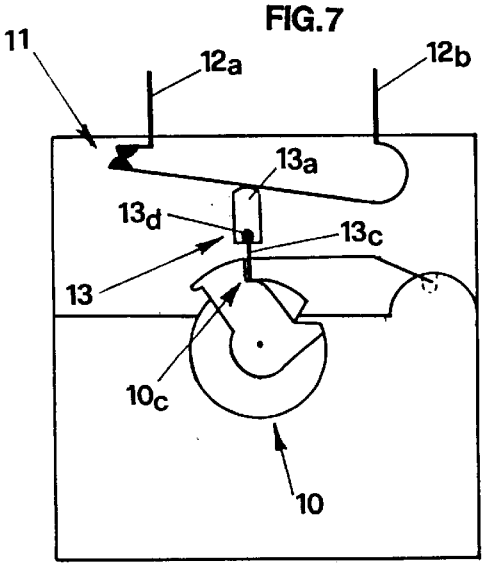

In conclusion when the pushrod 13c of the mobile assembly 13 fits into the second recess 10c of the cam 10 as can be seen in FIG. 8 and corresponding to a position where the knob 9a is set to the notch marked by E on the dial in FIG. 4, the contacts 11a, 11b are closed but the timer is not activated.

In the execution of the barbecue invention in description, the electrical contacts 11a, 11b are wired in series to an electrical thermocouple circuit, generally indicated by 14, which controls the cut-off valve 7, where the thermocouple 14a, as can be seen in FIG. 1, is mounted next to the flame of one of the burners 4.

In practice, to ignite the barbecue, the user opens the cut-off valve 7 and by pressing the button 15a of the ignition group generally indicated by 15, this creates a spark on the ignition electrode 15b that lights the flame in the burners 4.

The timer 8 is bypassed as can be seen by the position of the adjustment knob 9b, which in FIG. 1 is set to E.

The thermocouple 14a keeps the cut-off valve 7 open, which allows a continuous feed of gas along the main pipeline 6 and from this to the burners through the supply lines 5 and relative cocks 5a.

After finished cooking, to eliminate the fat deposited on the griddle and inside the container 2, the user sets the knob 9b of the timer 8 as illustrated in FIG. 2 and corresponding to a pre-set flame time for the barbecue, with the cut-off valve 7 opened to its maximum.

When the pre-set time has passed, the timer, as can be seen in FIG. 3, returns to O breaking the electric circuit 14 of the thermocouple 14a and cutting off the flow of gas by closing the cut-off valve 7 that shuts off the flame.

The flame time set on the timer 8 will naturally depend on the quantity of deposits to be burnt and the size of the barbecue.

The use of the timer described also allows a variant in execution of the barbecue invention where the timer is mechanically linked to the cut-off valve 7 the mobile assembly 12 for opening/closing the contacts 11a, 11b mechanically linked to the plug of the main cut-off valve.

The aforesaid variant is illustrated in FIG. 9 where it is generally indicated by 20 and where it can be seen that it differs from the execution described earlier by the lack of an electric thermocouple control circuit.

On the main pipeline 6 supplying gas to the burners 4, the cut-off valve, generally indicated by 21 and represented in the enlarged partial section in FIG. 10, has its plug 21a mechanically linked to the mobile assembly 13 of the timer 8 and working with the passageway 21b connected with the main pipeline 6 supplying the gas.

In particular, FIG. 10 shows how the protruding pin 13d of the mobile assembly 13 is connected to the plug 21a and this moves to open and close the passageway 21b following the movement of the timer's mobile assembly 13.

In practice when the user wants to ignite the barbecue, he sets the timer 8 with the knob 9b to the position marked by E and shown in FIG. 9 and then operates the ignition group 15 and lights the flame.

The barbecue is used for cooking food and remains burning for an indefinite time as desired by the user since the timer does not intervene.

Finished cooking the user sets the knob 9b of the timer 8 to any of the operating positions corresponding to a pre-set flame time where the pushrod 13c of the mobile assembly 13 is pressing against the edge 10b of the cam 10 and keeps the plug 21a of the cut-off valve 21 open.

As the time passes the cam 10 turns in an anticlockwise direction as indicated by the arrow 10e shown in FIG. 7 and when the pushrod 13c reaches the first recess 10a in the cam 10, it is lowered.

The protruding pin 13d is lowered together with the pushrod 13c and the whole mobile assembly 13, taking the plug 21a to close against the passageway 21b of the cut-off valve 21, as illustrated in FIG. 12.

The barbecue is then found in the set-up illustrated in FIG. 11 where the lack of gas supplied to the main pipeline 6 shuts off the flame.

It is clear that based on the above explanations the barbecue invention achieves all the set scopes.

In particular, it has been seen that by using the same timer the gas cut-off valve can be controlled both electrically and mechanically.

In actual production the barbecue invention may naturally be made in any shape or size and it can even be operated using different timers and cut-off valves to those described and illustrated in the figures. Any variants that have not been described, since falling under the claims below, shall all be covered by this invention.

What is claimed is:

1. Gas barbecue for grilling food comprising:
    a box-shaped container fitted inside with a griddle that carries the food being cooked
    one or more burners placed underneath said griddle, each of which has a gas supply line;
    a main pipeline which is connected to said supply lines for each burner, connected to a gas supply source and provided with a cut-off valve;
    at least one ignition device for said one or more burners, wherein the operation of said cut-off valve is connected to a timer suited to keeping it open for a pre-set time.

2. Barbecue according to claim 1, wherein said timer is of the type comprising a boxed casing which houses:
    a clockwork timer unit consisting of a series of wheelworks and means of spring-loading actuated by a knob;
    an actuator cam mechanically linked to said clockwork unit;
    electric contacts comprising at least one fixed contact and at least one mobile contact normally open, said at least one mobile contact being held by a flexible reed with one end fixed to said casing;
    a mobile assembly inserted between said actuator cam and said flexible reed for opening/closing said contacts.

3. Barbecue according to claim 2, wherein said mobile assembly comprises:
    a prod hinged by an arm onto said casing and working against said flexible reed;
    a pushrod pressing against said actuator cam;
    a pin protruding from said prod.

4. Barbecue according to claim 3, wherein said pushrod and said protruding pin are a single piece with said arm being made by modelling the actual arm.

5. Barbecue according to claim 2, wherein said timer is electrically wired to said cut-off valve having said electric contacts, connected in series to an electric control circuit of said cut-off valve, fitted with thermocouple.

6. Barbecue according to claim 3, wherein said timer is mechanically linked to said cut-off valve having said mobile assembly mechanically linked to the plug of said cut-off valve.

7. Barbecue according to claim 6, wherein said cut-off valve comprises a passageway connected with said main pipeline and works with an open/closed plug, said plug being mechanically linked to said protruding pin belonging to the mobile assembly of said timer.

8. Barbecue according to claim 1, wherein each of said supply lines has a regulator cock.

* * * * *